S. FARQUHAR.
Method of Attaching Slates to Roofs.
No. 209,031. Patented Oct. 15, 1878.
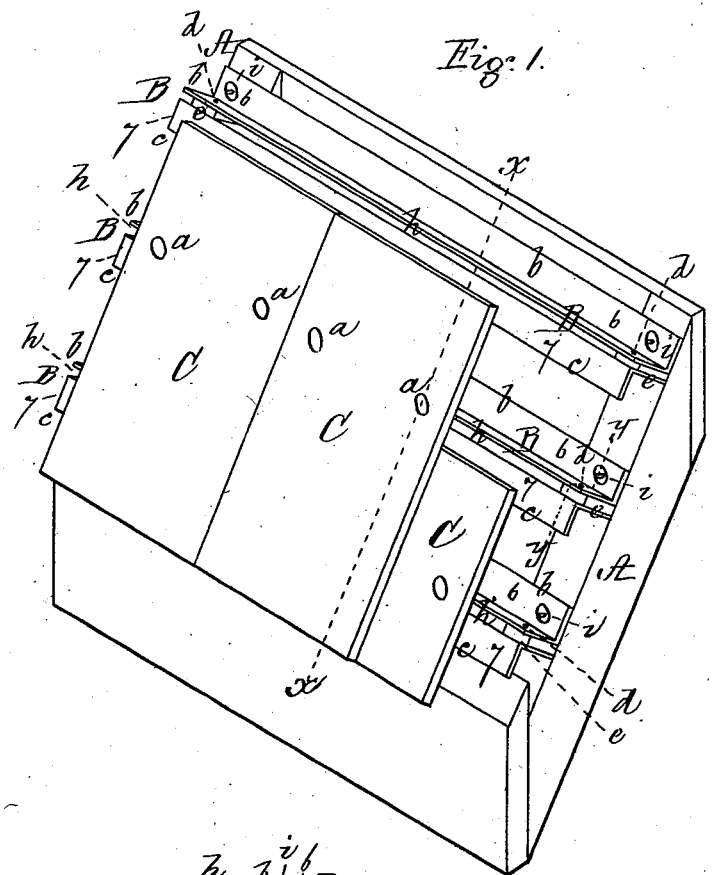
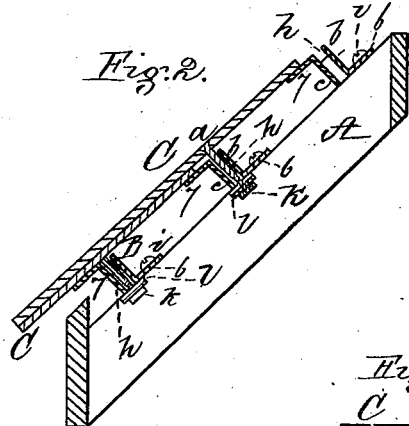
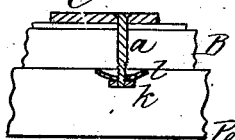
Witnesses
W. J. Cambridge
J. E. Cambridge
Inventor,
Samuel Farquhar,
Per Teschemacher & Stearns,
Attorneys.

UNITED STATES PATENT OFFICE.

SAMUEL FARQUHAR, OF BOSTON, MASSACHUSETTS, ASSIGNOR TO JOHN FARQUHAR'S SONS, OF SAME PLACE.

IMPROVEMENT IN METHODS OF ATTACHING SLATES TO ROOFS.

Specification forming part of Letters Patent No. 209,031, dated October 15, 1878; application filed September 30, 1878.

*To all whom it may concern:*

Be it known that I, SAMUEL FARQUHAR, of Boston, in the county of Suffolk and State of Massachusetts, have invented an Improved Method of Attaching Slates to Roofs, of which the following is a full, clear, and exact description, reference being had to the accompanying drawings, making part of this specification, in which—

Figure 1 is a perspective view of a portion of a roof of a building, representing my improved method of securing slates thereto. Fig. 2 is a vertical section on the line $x\,x$ of Fig. 1. Fig. 3 is a vertical section on the line $y\,y$ of Fig. 1; Fig. 4, detail.

My present invention consists in a purlin formed of a pair of angle-irons, separated by an interposing block or other device and bolted or riveted together, these irons being so arranged that the inner flange of one rests on the rafters and is secured thereto, while the outer flange of the other forms an extended bearing for the slates to rest on, the space between the two angle-irons affording a passage for the bolts or nails which pass through and hold the slates in place, each bolt or nail having a head, (which may be countersunk in the outer side of the slate,) the other end of the bolt or nail being secured by a nut or other device on the inner side of the purlin.

My invention also consists in a spring plate or washer introduced between the under side of the purlin and the nut or other fastening of the bolt or nail, to allow the latter to yield in the direction of its length to prevent the breakage of the slate from the contraction or expansion of the iron work of the roof, or from the effects of snow and ice.

To enable others skilled in the art to understand and use my invention, I will proceed to describe the manner in which I have carried it out.

In the said drawings, A represents the rafters of a roof, to which are secured the purlins B, upon which are laid the slates C, each provided with two countersunk holes for the passage of the bolts $a$. Each purlin B is composed of two angle-irons, $b\,c$, which are secured together by bolts or rivets $d$ passing through blocks $e$, which thus separate the two angle-irons, leaving a longitudinal space, $h$, between them for the passage of the bolts $a$, which hold the slates in place upon the purlins. The pair of angle-irons forming a purlin are so arranged that the inner flange, 6, of one iron, $b$, will rest squarely upon the rafters A, to which it is secured by screws $i$ or otherwise, while the outer flange, 7, of the other iron, $c$, forms an extended bearing-surface for the slates C. Each bolt $a$ is provided with a head, which fits into the countersink of the hole through the slate, so as to lie flush with its outer surface, the other end of the bolt having a screw-thread, over which turns a nut, $k$, between which and the under side of the purlin is placed a curved plate or washer, $l$, of spring metal, which allows the bolt $a$ to yield longitudinally, so that the contraction or expansion of the iron work of the roof will neither break the slate nor cause its fastening to become loose, and by means of this device the slates are also prevented from becoming broken if they should be raised by water freezing under them.

From the foregoing it will be seen that a purlin constructed in accordance with my invention can be easily secured to the rafters, and affords a firm and reliable bearing for the heads of the slates, besides allowing of the ready application of the fastening devices.

What I claim as my invention, and desire to secure by Letters Patent, is—

1. A purlin, B, formed of two angle-irons, $b\,c$, secured together with a space, $h$, between them, and so arranged that the inner flange, 6, of one will rest on the rafters A, while the outer flange, 7, of the other forms an extended bearing for supporting the slates, in combination with the fastening bolts or nails passing through the space $h$, substantially as and for the purpose described.

2. The spring-washer $l$, in combination with the fastening bolt or nail, slate C, and purlin B, formed of two angle-irons, with a space, $h$, between them, substantially as and for the purpose set forth.

Witness my hand this 28th day of September, A. D. 1878.

SAMUEL FARQUHAR.

In presence of—
P. E. TESCHEMACHER,
N. W. STEARNS.